US007990651B2

(12) United States Patent
Hsiao et al.

(10) Patent No.: US 7,990,651 B2
(45) Date of Patent: *Aug. 2, 2011

(54) METHOD OF MANUFACTURING A PERPENDICULAR MAGNETIC WRITE HEAD WITH STEPPED TRAILING MAGNETIC SHIELD WITH ELECTRICAL LAPPING GUIDE CONTROL

(75) Inventors: Wen-Chien David Hsiao, San Jose, CA (US); Hieu Lam, Milpitas, CA (US); Vladimir Nikitin, Campbell, CA (US); Sue Siyang Zhang, Saratoga, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 834 days.

This patent is subject to a terminal disclaimer.

(21) Appl. No.: 11/956,292

(22) Filed: Dec. 13, 2007

(65) Prior Publication Data
US 2009/0152235 A1 Jun. 18, 2009

(51) Int. Cl.
*G11B 5/187* (2006.01)
(52) U.S. Cl. ............... 360/122; 360/125.42; 360/125.46; 360/125.51; 360/125.59; 360/125.64
(58) Field of Classification Search .................. None
See application file for complete search history.

(56) References Cited

U.S. PATENT DOCUMENTS

| 7,002,775 | B2 | 2/2006 | Hsu et al. | 360/125 |
|---|---|---|---|---|
| 7,042,682 | B2 | 5/2006 | Hu et al. | 360/317 |
| 7,110,217 | B2 | 9/2006 | Lee et al. | 360/126 |
| 7,793,406 | B2* | 9/2010 | Zheng | 29/603.16 |
| 2001/0010870 | A1* | 8/2001 | Song et al. | 428/694 TS |
| 2001/0041272 | A1* | 11/2001 | Song et al. | 428/694 TS |
| 2006/0070231 | A1 | 4/2006 | Baer et al. | 29/603.01 |
| 2006/0174474 | A1 | 8/2006 | Le | 29/603.12 |
| 2009/0152234 | A1* | 6/2009 | Guthrie et al. | 216/22 |
| 2010/0155364 | A1* | 6/2010 | Pentek et al. | 216/11 |
| 2010/0157472 | A1* | 6/2010 | Hsiao et al. | 360/123.12 |

FOREIGN PATENT DOCUMENTS

JP 2005/108411 4/2005
(Continued)

OTHER PUBLICATIONS

Nakamoto et al., "CPP-GMR Reader and Wraparound Shield Writer for Perpendicular Recording" IEEE. Transactions on Magnetics, vol. 41, No. 10, Oct. 2005.

(Continued)

*Primary Examiner* — Duy-Vu N Deo
(74) *Attorney, Agent, or Firm* — Zilka-Kotab, PC

(57) ABSTRACT

A method for manufacturing a magnetic write head having a stepped trailing shield. The stepped trailing shield is formed by forming a non-magnetic bump over a write pole prior to electroplating a wrap-around magnetic shield. The method allows the location of the front edge of the bump relative to the back edge of the wrap-around shield to be monitored by measuring the electrical resistance of an electrical lapping guide formed concurrently with these features. This concurrent formation of a lapping guide can be used to define the relative location of other features as well, such as the location of a back edge of a wrap-around shield relative to a flare point of a write pole.

23 Claims, 24 Drawing Sheets

FOREIGN PATENT DOCUMENTS

JP    2006-221687    8/2006

OTHER PUBLICATIONS

Yamakawa et al.. "High Writability Head With Robustness Against Stray Field and Narrow-Track. Recording Properties" IEEE Transactions on Magnetics, vol. 38, No. 4, Jul. 2002.

Okamoto et al., "Magnetic Shield Design of Perpendicular Magnetic Recording Head by Using Topology Optimization Technique" IEEE Transactions on Magnetics, vol. 41, No. 5, May 2005.

Greaves et al., "Trailing Shield Head Recording In Discrete Track Media" IEEE Transactions on Magnetics, vol. 42, No. 10, Oct. 2006.

Okada, et al,, "Newly Developed Wraparound-Shielded Head for Perpendicular Recording" IEEE Transactions on Magnetics, vol. 41, No. 10, Oct. 2005.

Hsu et al., "Challenges for Perpendicular Write Heads at High Recording Density" IEEE Transactions on Magnetics, vol. 43, No. 2, Feb. 2007.

* cited by examiner

METHOD OF MANUFACTURING A PERPENDICULAR MAGNETIC WRITE HEAD WITH STEPPED TRAILING MAGNETIC SHIELD WITH ELECTRICAL LAPPING GUIDE CONTROL

FIELD OF THE INVENTION

The present invention relates to perpendicular magnetic recording and more particularly to a method for manufacturing a magnetic write head having a stepped trailing shield structure for improved magnetic performance.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Although such perpendicular magnetic recording heads have the potential to increase data density over longitudinal recording system, the ever increasing demand for increased data rate and data density requires even further improvement in write head design. For example it is desirable to increase the write field gradient for better data error rate performance. One way to do this is to place a trailing shield adjacent to the trailing edge of the write pole. However, manufacturing limitations and design limitations have limited the performance of such a trailing shields, resulting in less than optimal write field and transition curvature. Therefore, there is a strong felt need for a write head design that can provide optimal write head performance, including optimal trailing shield performance. There is also a strong felt need for a practical method for manufacturing such a write pole having such an optimal design.

SUMMARY OF THE INVENTION

The present invention provides a method for manufacturing a magnetic write head for perpendicular magnetic recording. The method includes forming a first mask structure over a substrate, the first mask structure being formed to cover a feature area, and leaving an electrical lapping guide area uncovered. Then, an electrically conductive layer is deposited in the electrical lapping guide area. The first hard mask layer is then removed and a hard mask layer is deposited. A second mask structure is then formed, the second mask structure having a front edge in the feature area that is configured to define a front edge of a first feature and a front edge in the electrical lapping guide area that is configured to define a front edge of an electrical lapping guide. Then, a reactive ion etching is performed to remove portions of the hard mask layer that are not protected by the second mask structure, and an ion milling is performed to remove portions of the electrically conductive layer that are not protected by the remaining hard mask layer. A structure is then electroplating having a back edge defining a second feature in the feature area and a mask having a back edge in the electrical lapping guide area. Then, an ion milling is performed to remove portions of the electrically conductive material to define a back edge of an electrical lapping guide, wherein the lapping guide has an electrical resistance that correlates to a distance between the first and second features. The electrical resistance of the electrical lapping guide can then be measured to determine the distance between the first and second features.

A method according to the present invention can be used to accurately determine the distance between a back edge of a wrap-around magnetic shield and a front edge of a non-magnetic bump, thereby accurately determining the position of a step formed in a stepped wrap-around magnetic shield.

Such a method can also be used to accurately determine a distance between other features, such as the distance between a back edge of a trailing shield and a flare point of a magnetic write pole.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
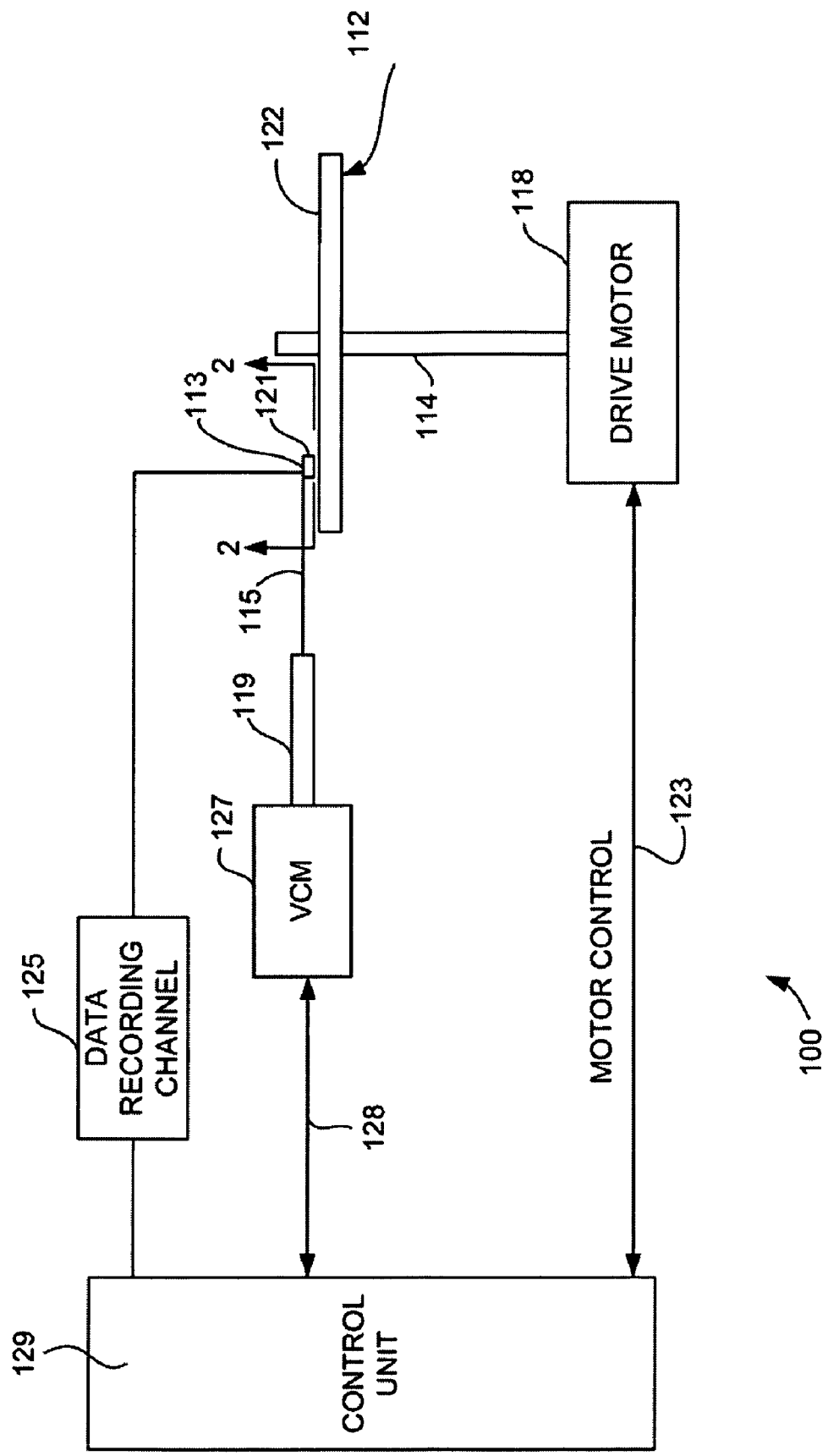
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
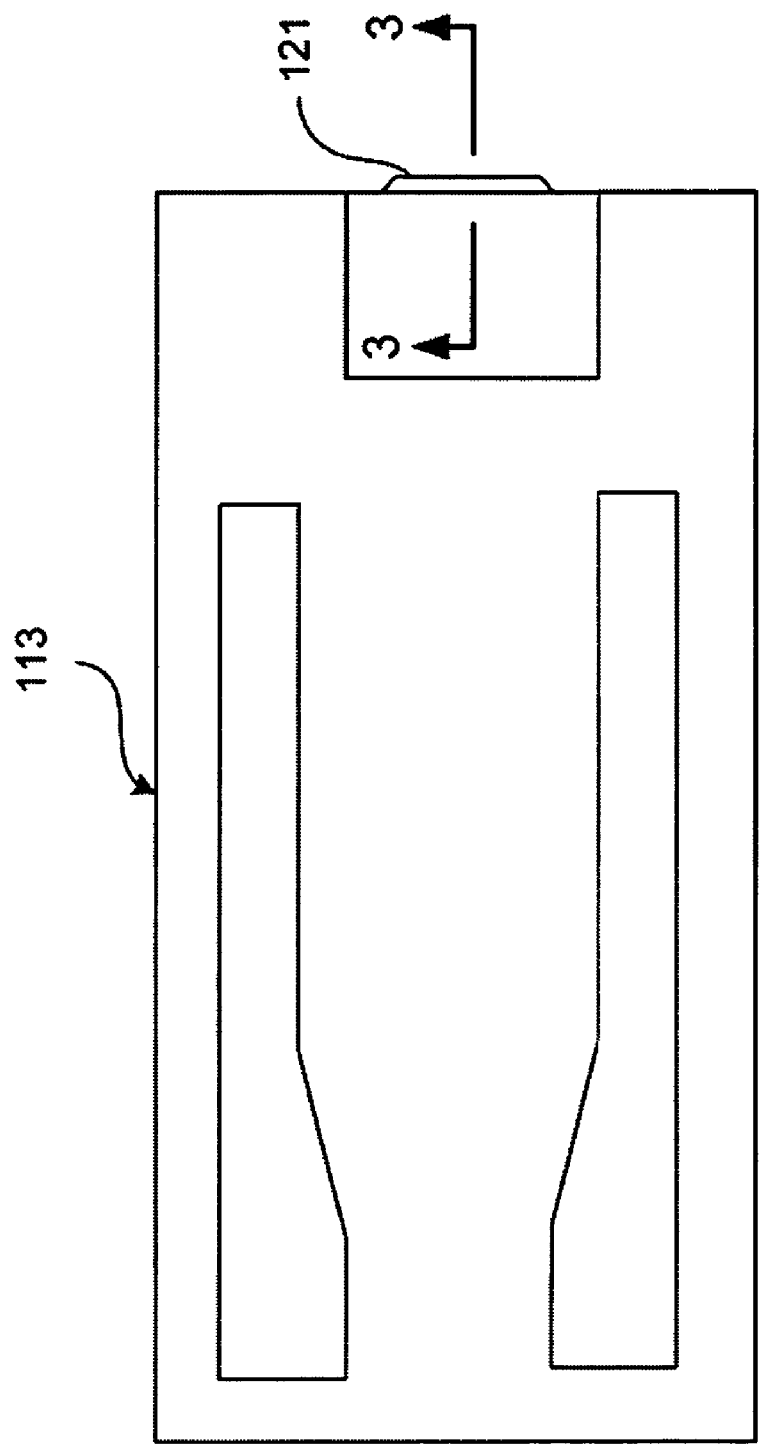
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
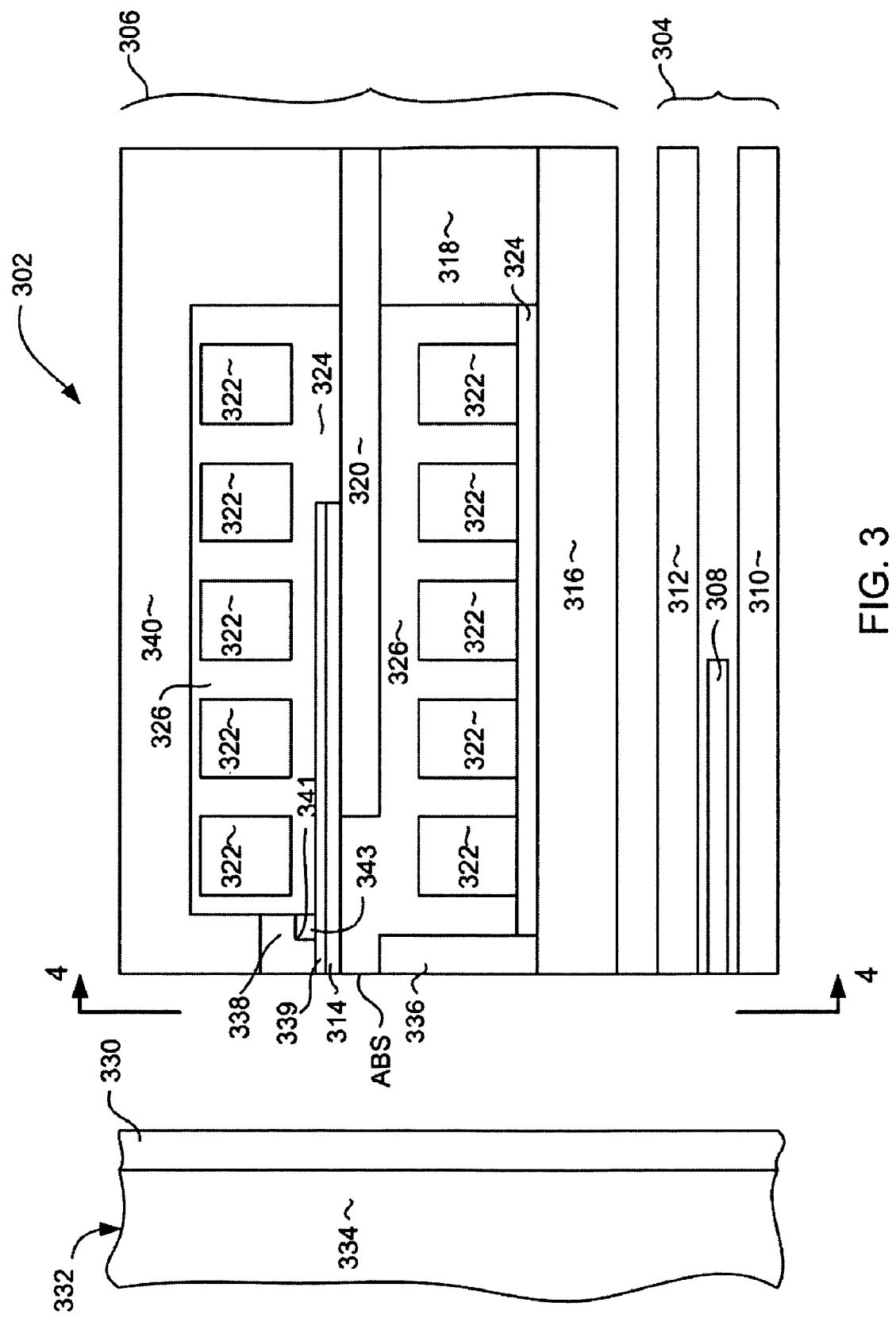
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314.

In order to increase write field gradient, and therefore, increase the speed with which the write head 306 can write data, a trailing magnetic shield 338 can be provided. The trailing magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient.

With reference still to FIG. 3, the trailing shield 338 has a step 341 formed at its back edge away from the ABS. This step 341 is formed by a non-magnetic bump 343 that is strategically located between a portion of the trailing shield 338 and the trailing gap layer 339 and write pole 314. This step 341 improves the performance enhancing effects of the trailing shield by achieving better write field strength due to less flux shunting to back of trailing shield 338 while also preventing magnetic saturation of the trailing shield. This step 341 and a method for manufacturing such a step will be discussed in greater detail below.

Figure 4:
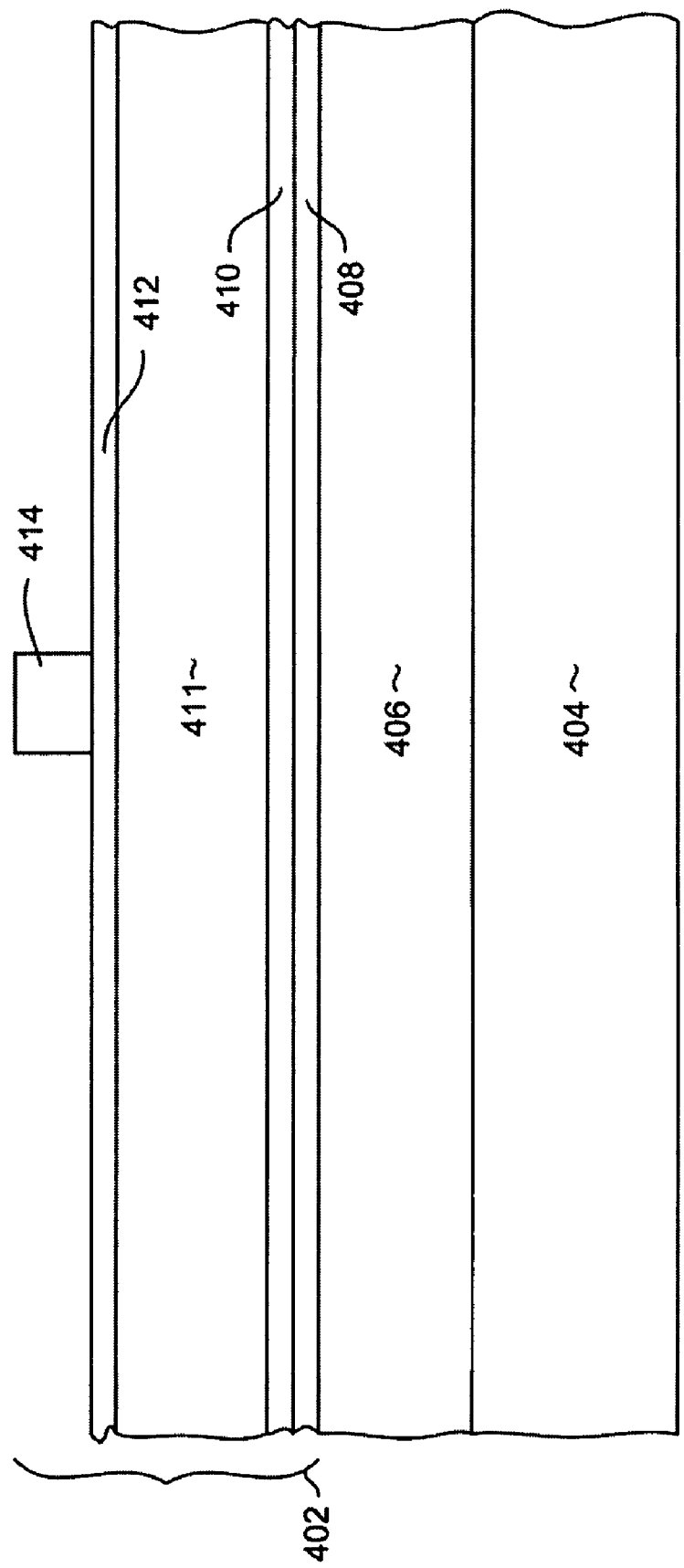
FIG. 4 is an ABS view of a portion of the write head of FIG. 3.

With reference now to FIGS. 4-19 a method is described for manufacturing a write head with a bump 343 and step 341. This method allows the front edge of the bump 343 (and therefore the step 341) to be accurately located relative to the back edge of the shield 338, as will be seen. With particular reference to FIG. 4, a substrate 404 is provided. The substrate 404 may include the insulation layer 326 and a portion of the shaping layer 320 described above with reference to FIG. 3. A magnetic write pole material 406 is deposited over the substrate 404. The magnetic write pole material 406 is preferably a lamination of magnetic layers separated by thin non-magnetic layers. A mask structure 402, constructed of a series of mask layers is deposited over the magnetic write pole material. The mask structure 402 includes a first hard mask layer 408, which is preferably alumina, deposited over the magnetic write pole material. This hard mask layer 408 is preferably deposited to a thickness that will define a trailing gap in the finished head. A second hard mask layer 410 is deposited over the first hard mask layer. The second hard mask layer is constructed of a material that can be removed by Reactive Ion Etching (RIE) such materials being referred to herein as "RIEable" materials. An image transfer layer 411 can be deposited over the RIEable second hard mask layer 410. The image transfer layer can be constructed of a soluble polyimide material such as DURAMIDE®. A third hard mask layer 412, such as $SiO_2$, may also be deposited over the image transfer layer 411. A photoresist layer 414 is then deposited over the other underlying mask layers 408-412, and is photolithographically patterned to define a write pole shape, which is shown in cross section in FIG. 4.

Figure 5:
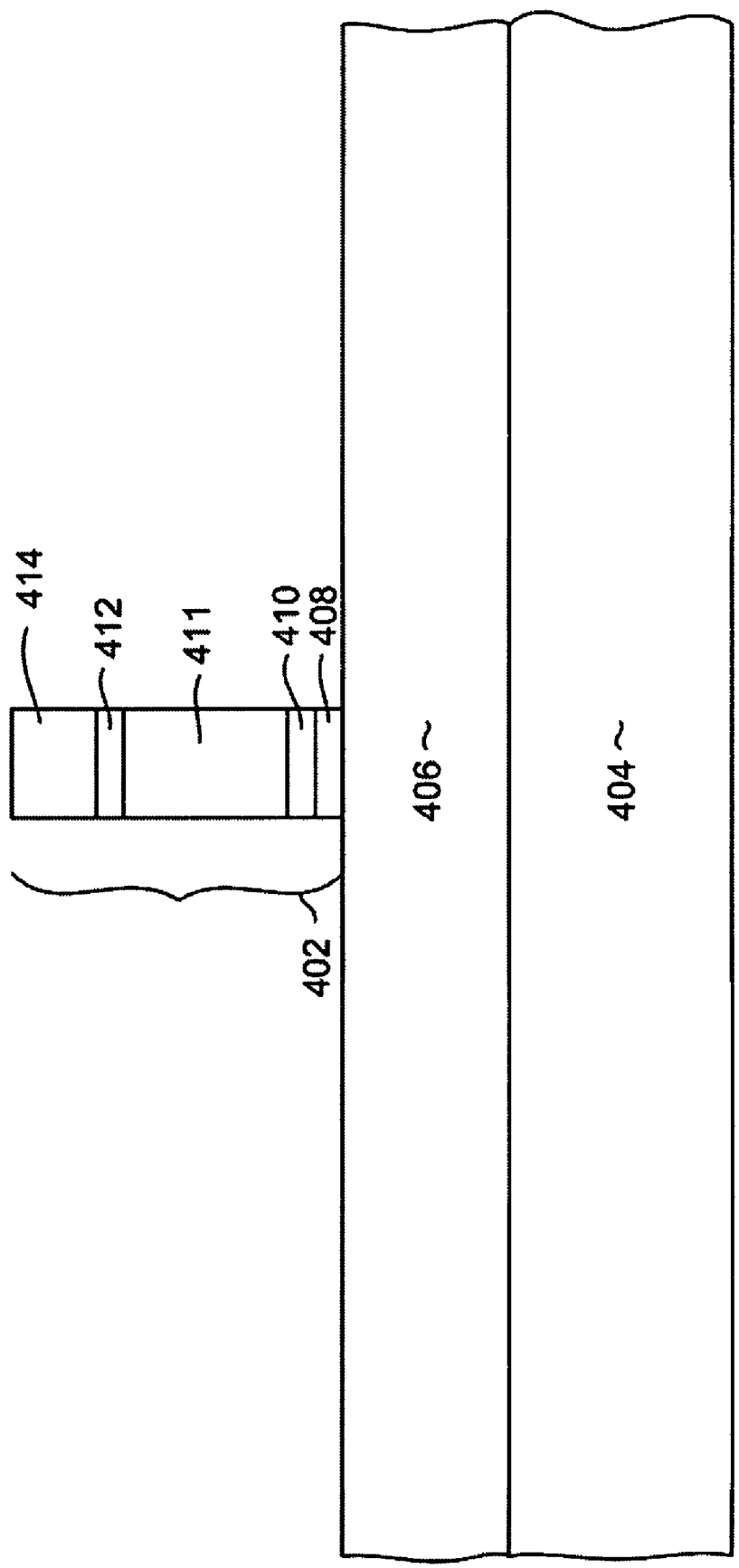
FIGS. 5-19 are views of a write head in various intermediate stages of manufacture illustrating method for manufacturing a write head according to an embodiment of the invention.
Figure 6:
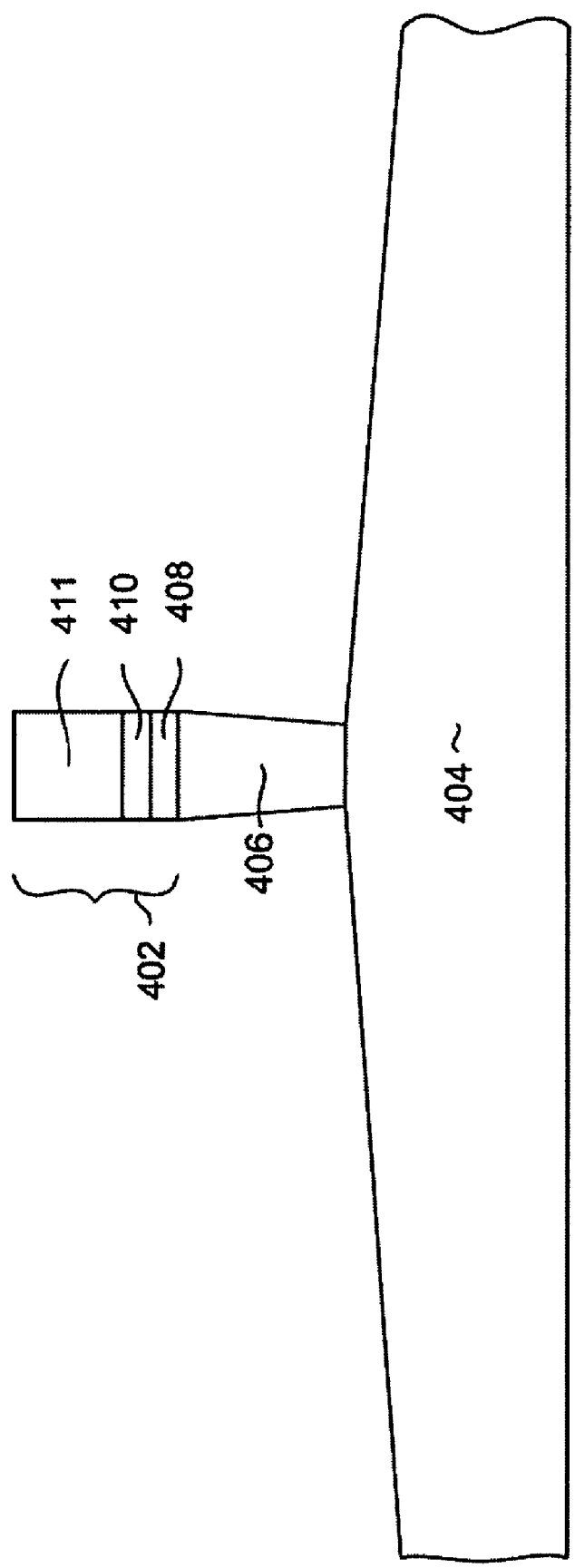

With reference now to FIG. 5, a reactive ion etching (RIE) (or combination of reactive ion etching and reactive ion milling) is performed to transfer the image of the photoresist mask 414 onto the underlying mask layers 408-412 by removing portions of the layers 408-412 that are not protected by the mask 414. Then, an ion milling operation is performed to remove portions of the magnetic write pole material 406 that are not protected by the mask structure. The ion milling can be performed at one or more angles relative to normal in order to form a write pole 406 having a trapezoidal shape as shown in FIG. 6. Also, as shown in FIG. 6, a portion of the mask structure 402 will be consumed by the ion milling process, leaving the first and second hard mask layers 408, 410 and possibly a portion of the image transfer layer 411.

Figure 7:
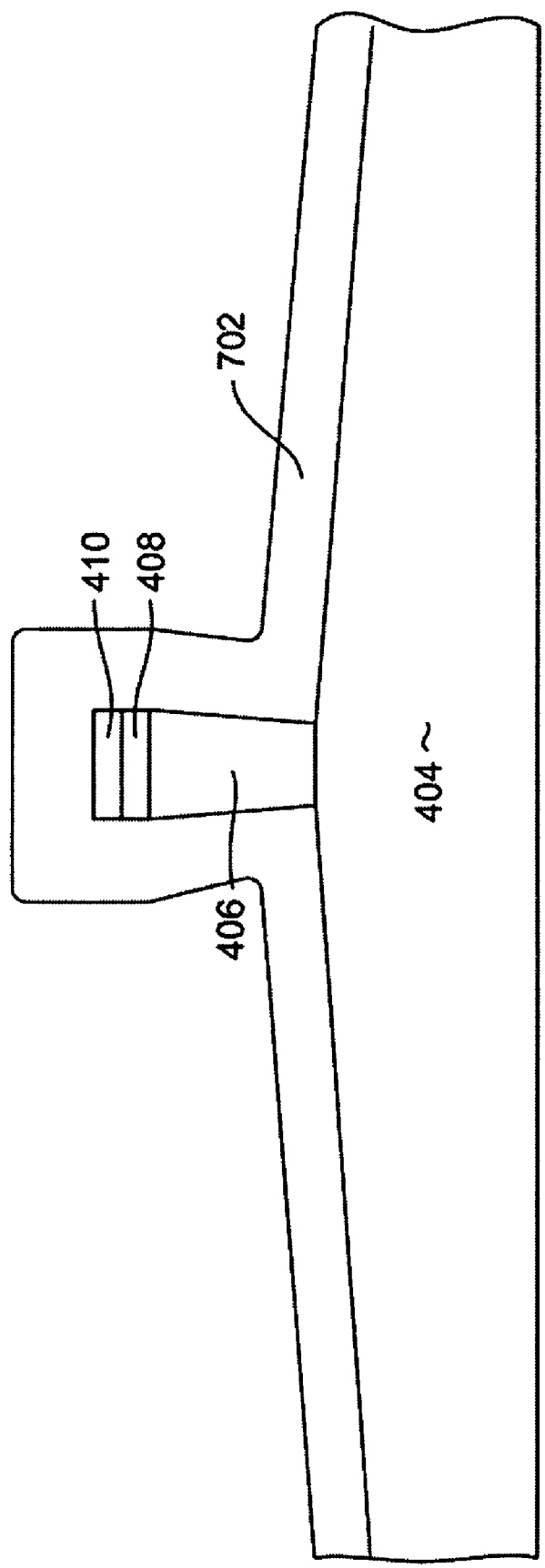
Figure 8:
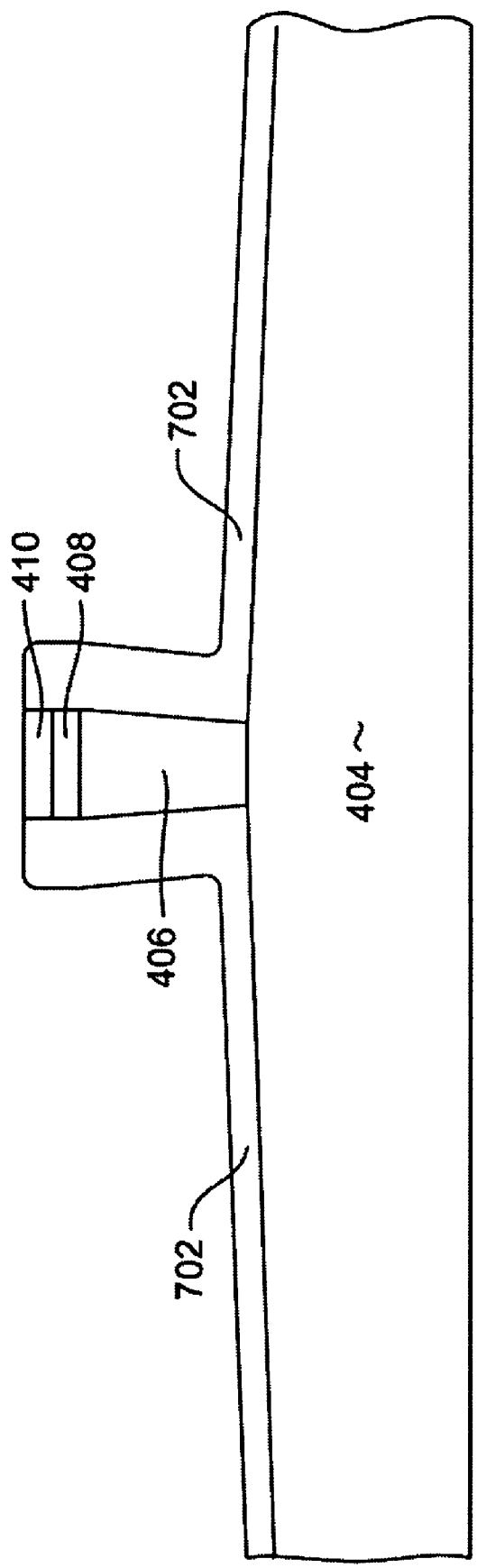
Figure 9:
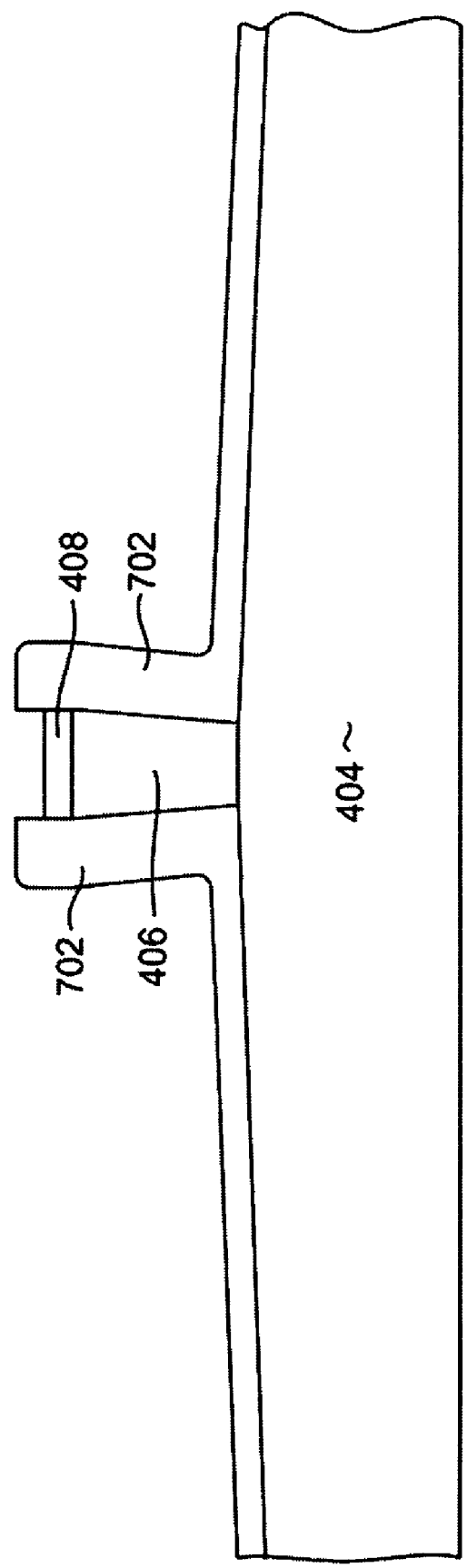

With reference now to FIG. 7, a wet stripping process will be performed to remove layer 411, before a layer of non-magnetic sidewall material 702 is deposited. The non-magnetic side wall material 702 is preferably alumina and is preferably deposited by a conformal deposition process such as atomic layer deposition or chemical vapor deposition. Then, a material removal process is performed to preferentially remove horizontally disposed portions of the non-magnetic gap layer 702 leaving vertical, non-magnetic side gap walls 702 at either side of the write pole 406 as shown in FIG. 8. The material removal process can be, for example, ion milling or could include refilling with a RIEable fill layer, performing a chemical mechanical polishing process and then performing a reactive ion etching to remove the RIEable fill layer. Then, a reactive ion etching can be performed to remove the RIEable hard mask layer 410, leaving a structure as shown in FIG. 9.

Figure 10:
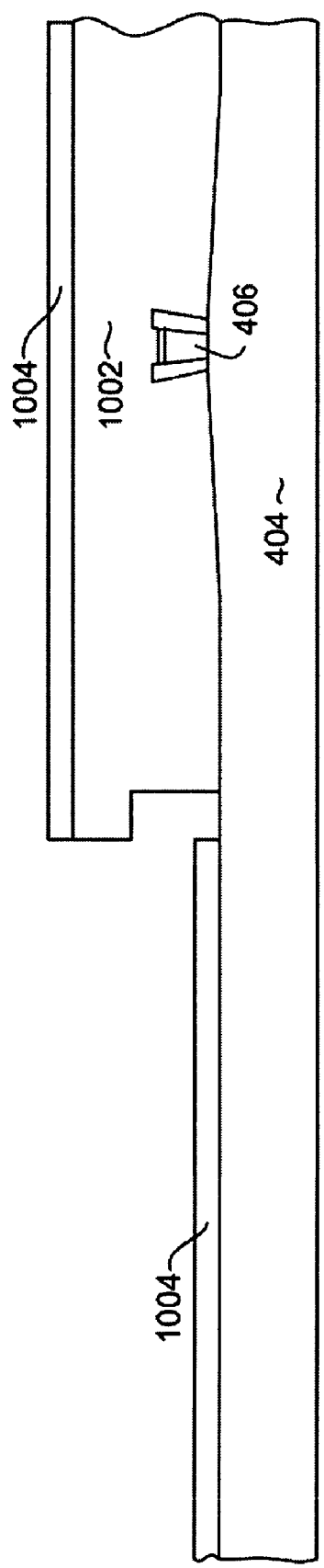

With reference now to FIG. 10, a bi-layer photoresist mask 1002 is formed to cover a region where the write pole 406 is, but leaving a region open where an electrical lapping guide (ELG) will be formed. A non-magnetic metal 1004 is then deposited full film. The non-magnetic metal 1004 can be, for example, Ru, Au, Ir, Rh, etc. The bi-layer mask 1002 can then be lifted off. The bi-layer shape of the mask 1002 facilitates liftoff, when the mask has been covered with the non-magnetic metal 1004.

Figure 11:
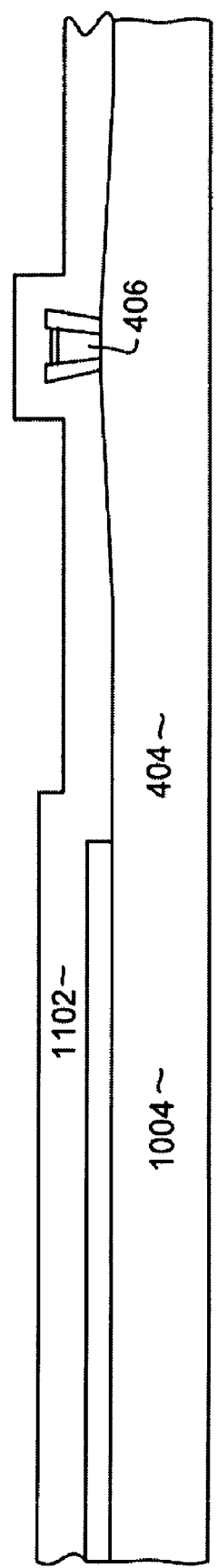

With reference now to FIG. 11, a non-magnetic layer 1102 is deposited fill film. This non-magnetic layer 1102 will end up forming the bump 343 described above with reference to FIG. 3, and is preferably constructed of TaO, although some other material could possibly be used instead.

Figure 12:
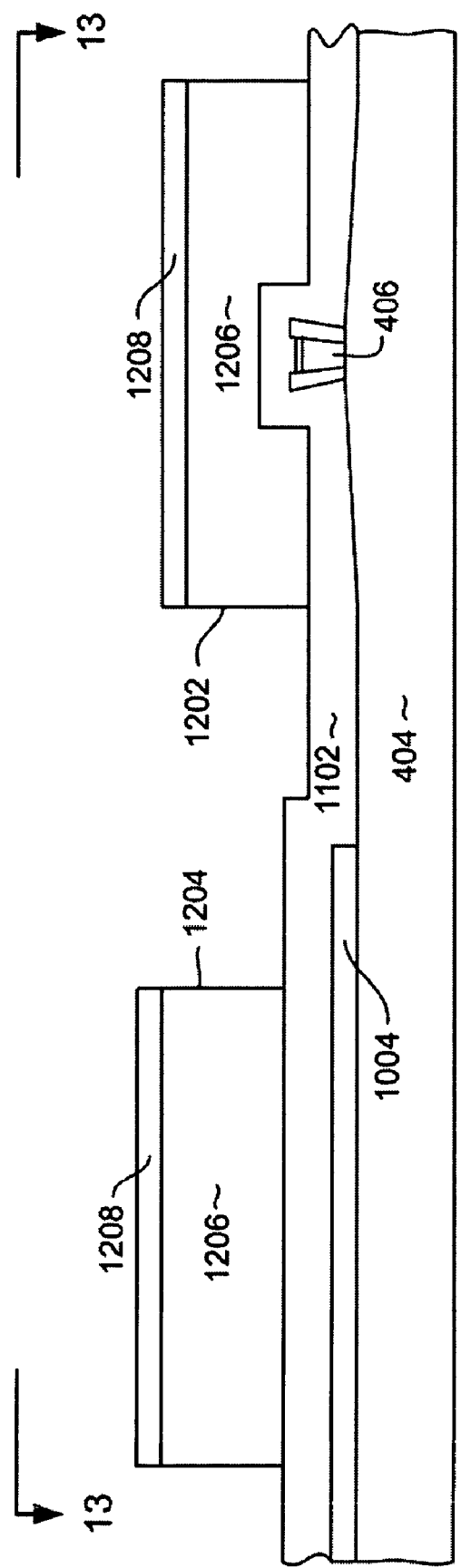
Figure 13:
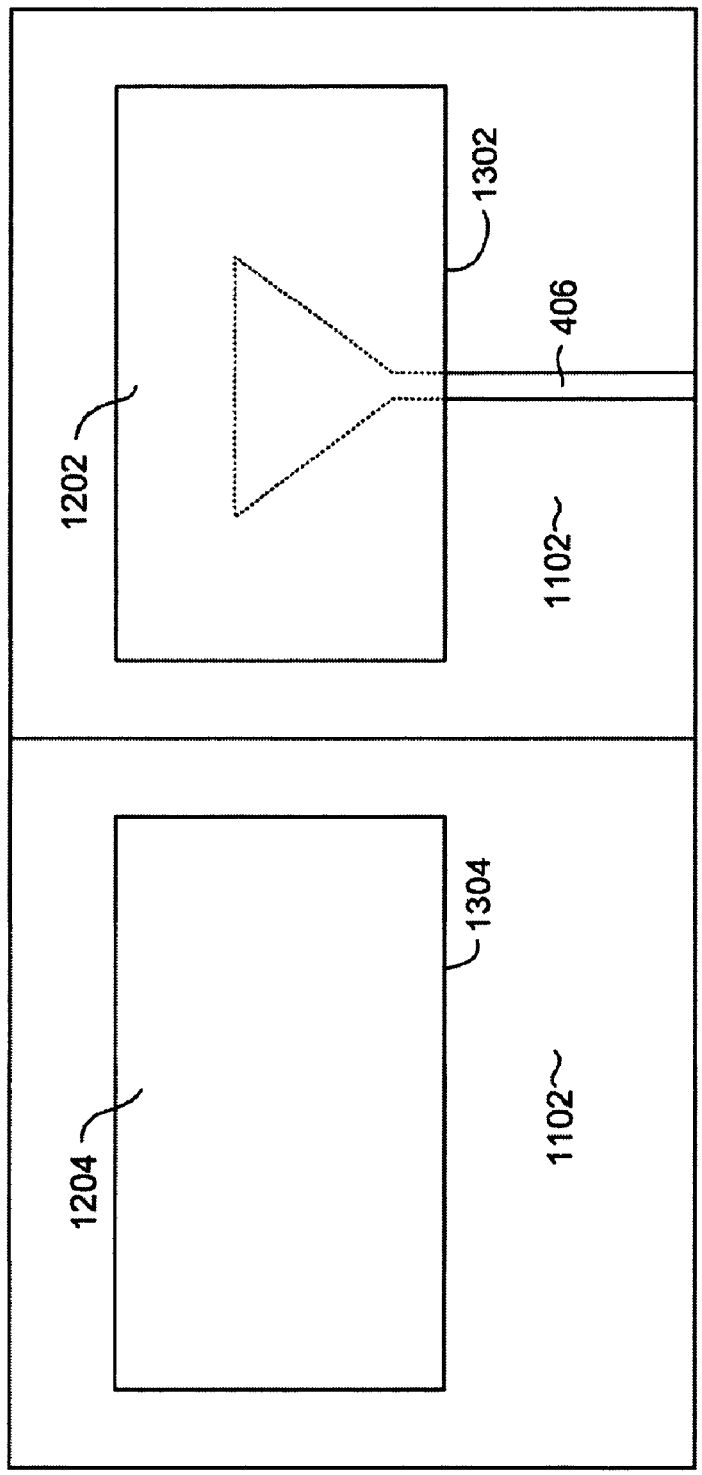

With reference now to FIG. 12, a mask structure including first and second mask portions 1202, 1204 is constructed. The mask portions 1202, 1204 each preferably include an image transfer layer 1206 such as DURAMIDE® and a short wavelength photolithgraphically patterned photoresist layer 1208, or a single, thick photoresist layer. If 1202, 1204 consist of two layers like 1206 and 1208, a reactive ion etch process can be used to transfer photolithographically defined image of 1208 into layer 1206. FIG. 13, shows a top down view of the mask portions 1202, 1204. As can be seen, the mask portions 1202, 1204, each have a front edge 1302, 1304 and these front edges 1302, 1304 are aligned with one another. Because the mask structures 1202, 1204 are patterned in a common photolithography, they are very accurately aligned relative to one another.

Figure 14:
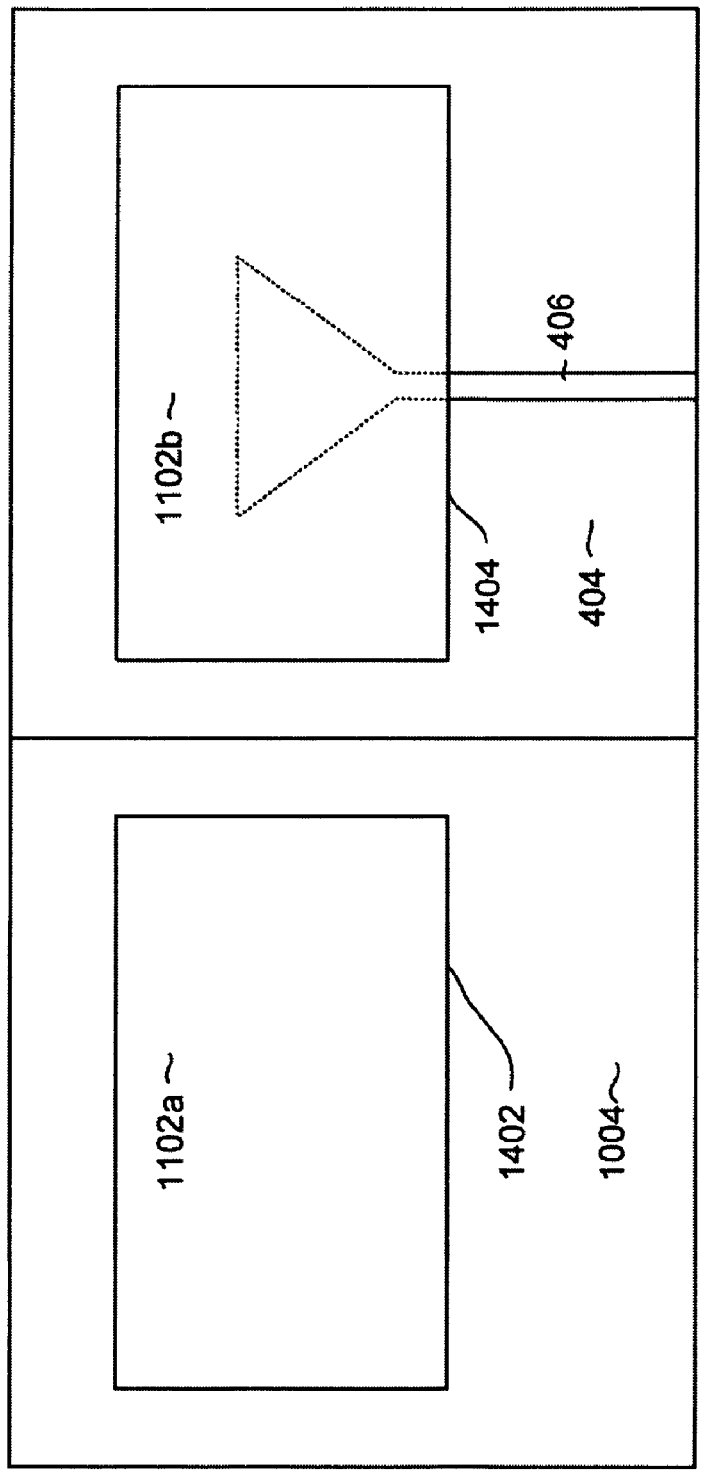

A reactive ion etching (RIE) is performed to remove portions of the non-magnetic material 1102 (eg. TaO layer) that are not protected by the mask structures 1202, 1204. The mask 1202 can be lifted off, resulting in a structure as shown in FIG. 14, with non-magnetic metal 1004 in the region outside of the non-magnetic layer 1102a in the ELG region and the alumina substrate 404 outside of the non-magnetic layer 1102b in the write pole region. The front edge 1404 of the non-magnetic layer 1102b over the write pole 406 defines the front edge of a shield bump, as will be seen below. It should be pointed out, that the front edge 1402 of the layer 1102a is self aligned with the front edge 1404 of the layer 1102b, both layers having been formed by the same photolithographic patterning process and the same RIE process.

Figure 15:
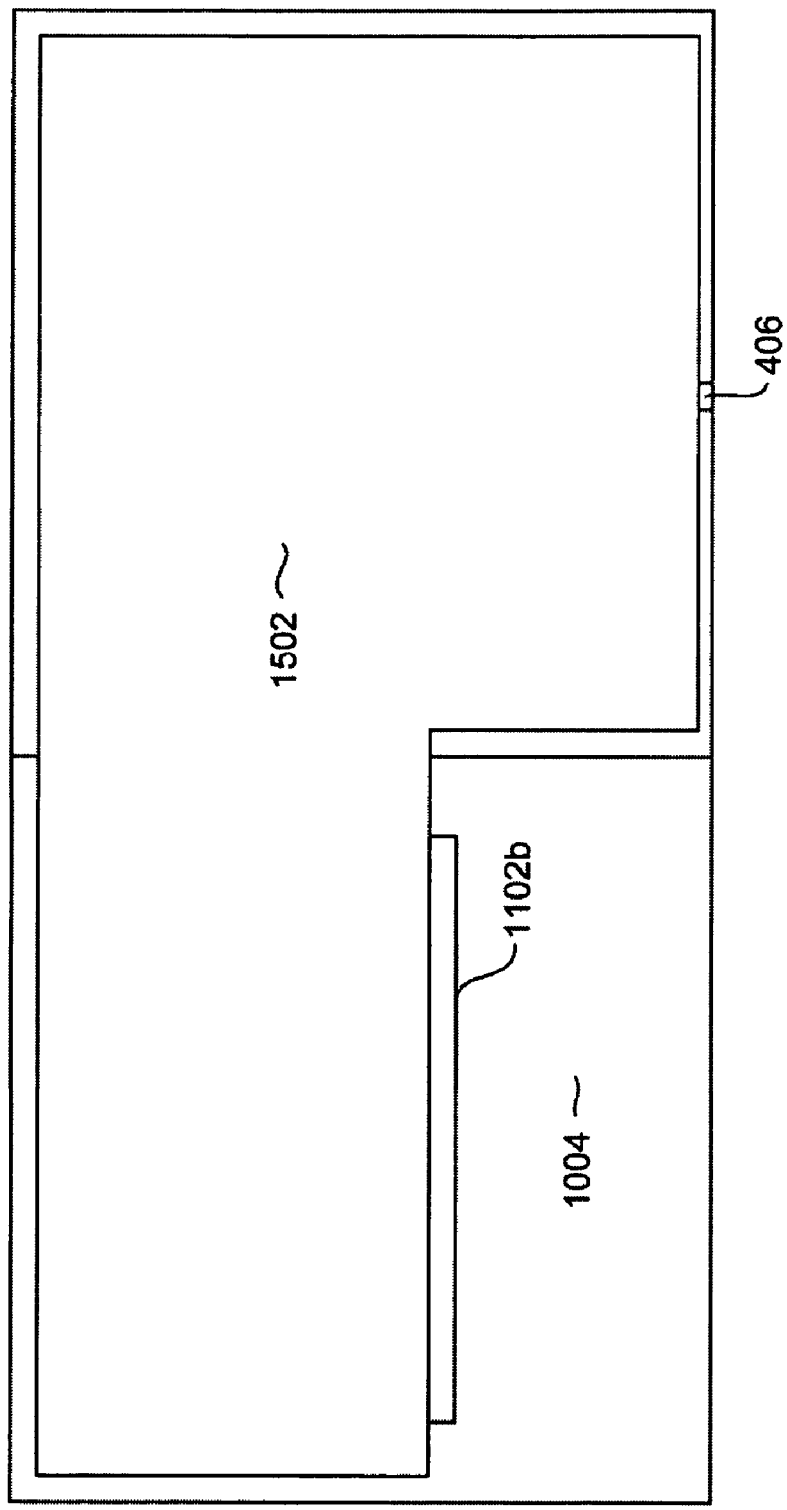
Figure 16:
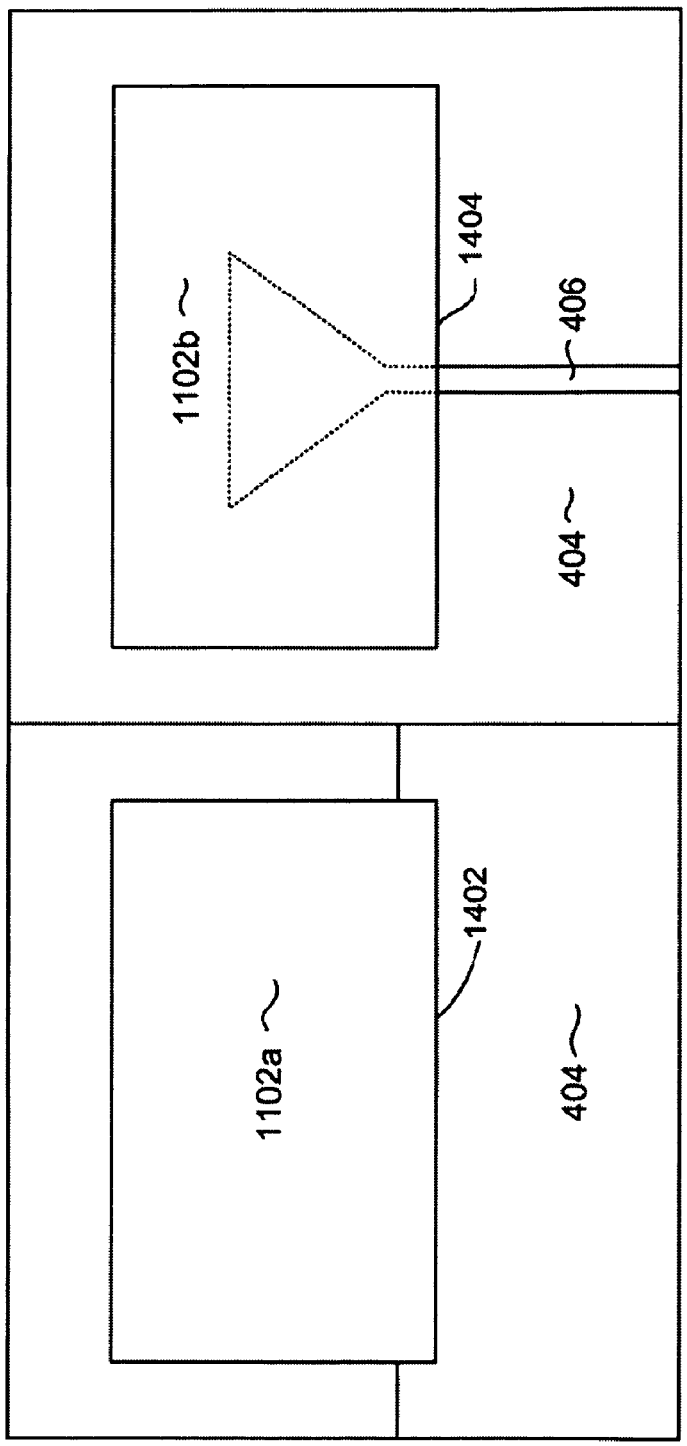

After a wet stripping process that removes 1202 and 1204, another photoresist mask 1502 is then formed as shown in FIG. 15 to cover the write pole 404 (FIG. 14) and most of the non-magnetic layer 1102 with front edge 1402 exposed. An ion milling can then be performed, using the non-magnetic layer 1102 (e.g. TaO) as a mask, to remove portions of the non-magnetic metal 1004 that are not protected by the mask 1502 or by the non-magnetic layer 1102. In this way, the front edge of the layer 1102 forms a mask that defines a front edge of an Electrical Lapping Guide (ELG), this front edge of the ELG being self aligned with the front edge 1404 of the shield bump as shown in FIG. 14. The mask 1502 (FIG. 15) can then be lifted off, leaving a structure as shown in FIG. 16.

Figure 17:
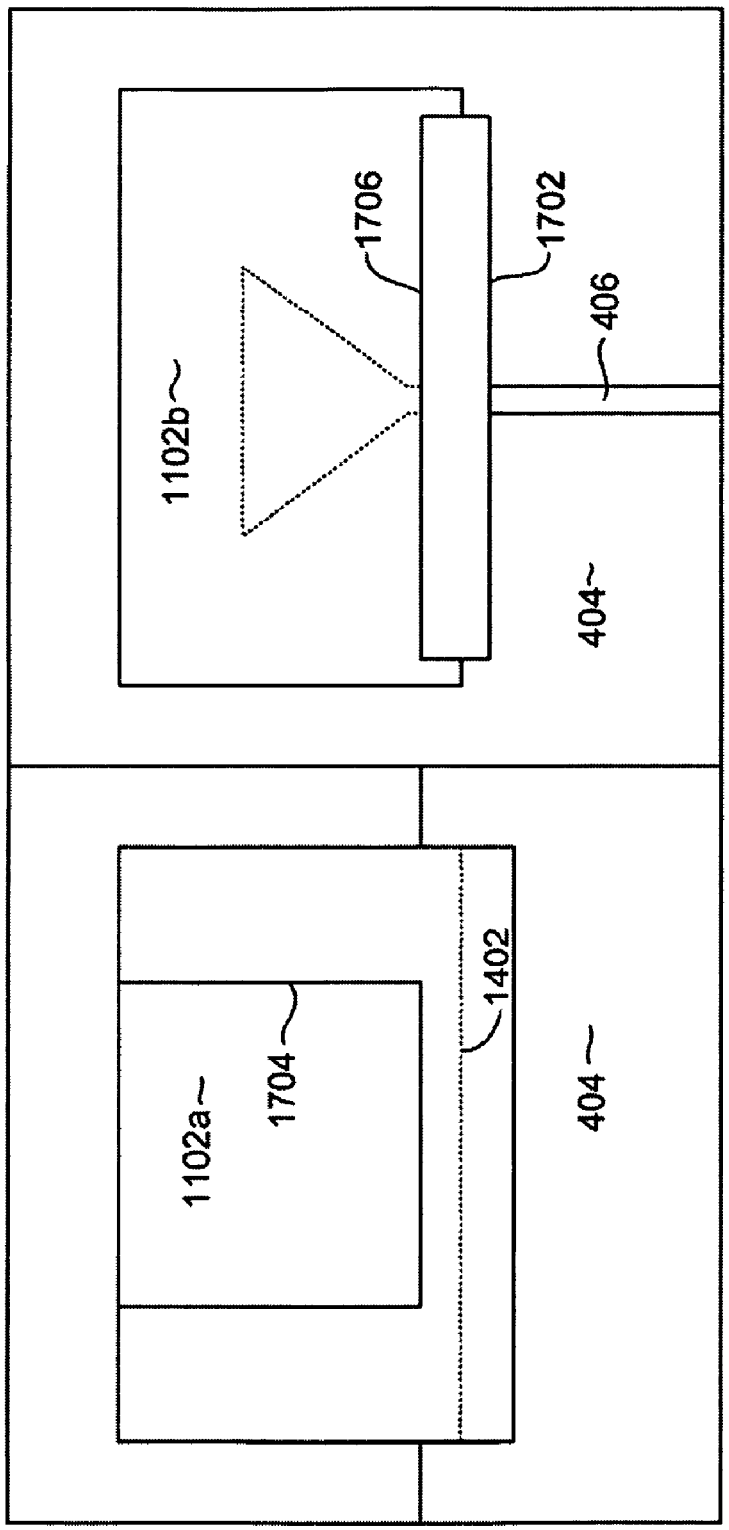
Figure 18:
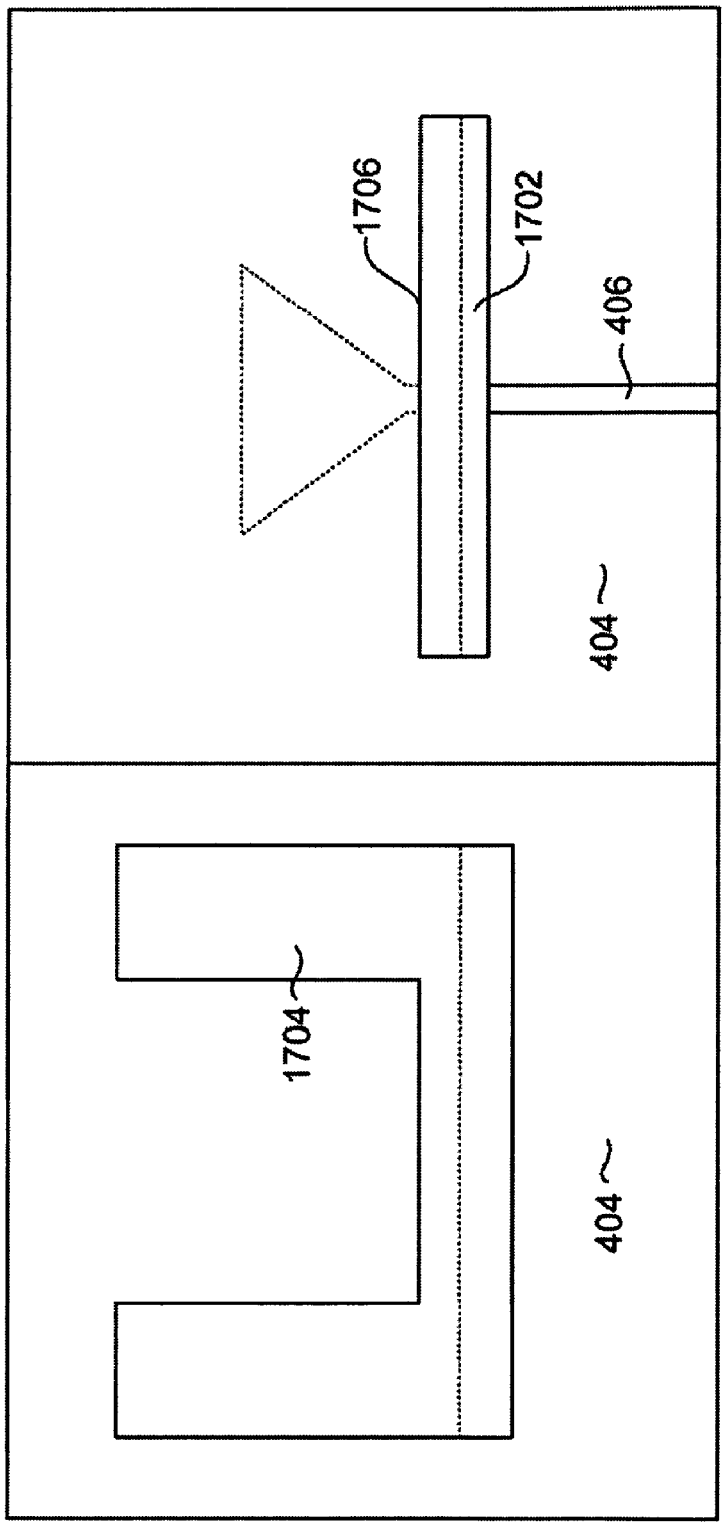
Figure 19:
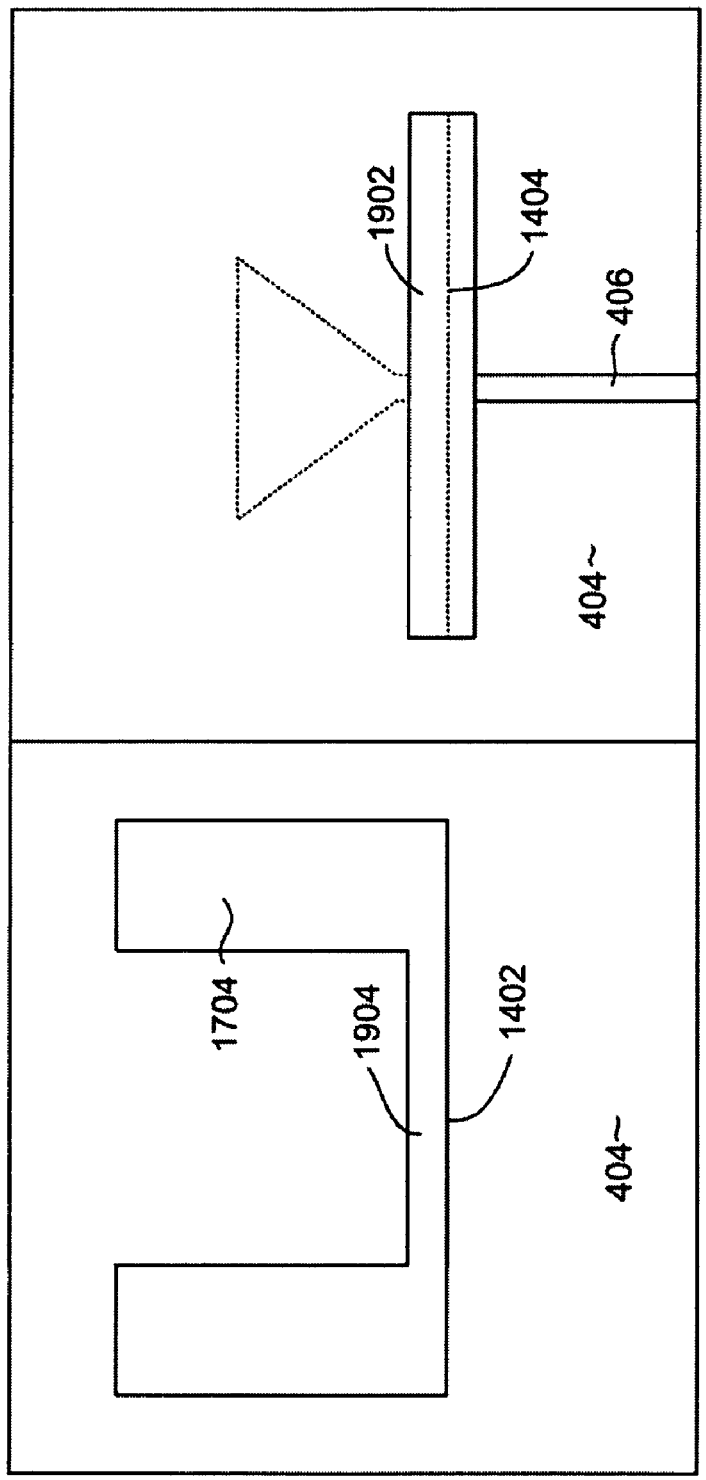

With reference now to FIG. 17, a thin, magnetic seed layer (not shown) will be deposited full film so that a magnetic material such as NiFe or CoFe can be electroplated to form a wrap-around magnetic shield 1702 and an electrical lapping guide mask (ELG mask) 1704. The shield 1702 and the ELG mask 1704 are both defined by a common photolithographic patterning and plating process that involves depositing a seed layer, then depositing a layer of photoresist full film and photolithographically patterning and developing the photoresist layer to form mask having openings where the shield 1702 and ELG mask 1704 will be. The mask can then be removed and the seed layer removed. Note that the front edge 1402, shown in dashed line, can be beneath the ELG mask 1704. Also, the back edge of the ELG mask 1704 is self aligned with the back edge 1706 of the shield 1702. An ion milling can then be performed using the plated ELG mask 1704 as a mask to define an electrical lapping guide, resulting in a structure as shown in FIG. 18. Then, ELG mask 1704 can be removed, leaving a structure as shown in FIG. 19. The ELG mask 1704 can be removed by first performing a wet etch process followed by performing a reactive ion etching to remove TaO, while keeping the write pole 406 protected by a mask (not shown), and then lifting off that mask.

With reference then to FIG. 19, it can be seen that the above process results in a non-magnetic bump structure (formed from the non-magnetic layer 1102b under the shield layer 1702) having a front edge 1404 that is self aligned with the front edge 1402 of the ELG, and that has a back edge 1902 that is self aligned with the back edge 1904 of the ELG 1704. In addition, the back edge 1902 of the non-magnetic bump is self aligned with the back edge of the wrap around shield. Therefore, the distance between the front and back edges of the non-magnetic bump 1102b also defines the distance between the front edge of the non-magnetic bump and the back edge of the wrap-around shield 1902. This therefore, provides a means for accurately defining the non-magnetic bump 343 and position of the step 341 described above with reference to FIG. 3.

Figure 20:
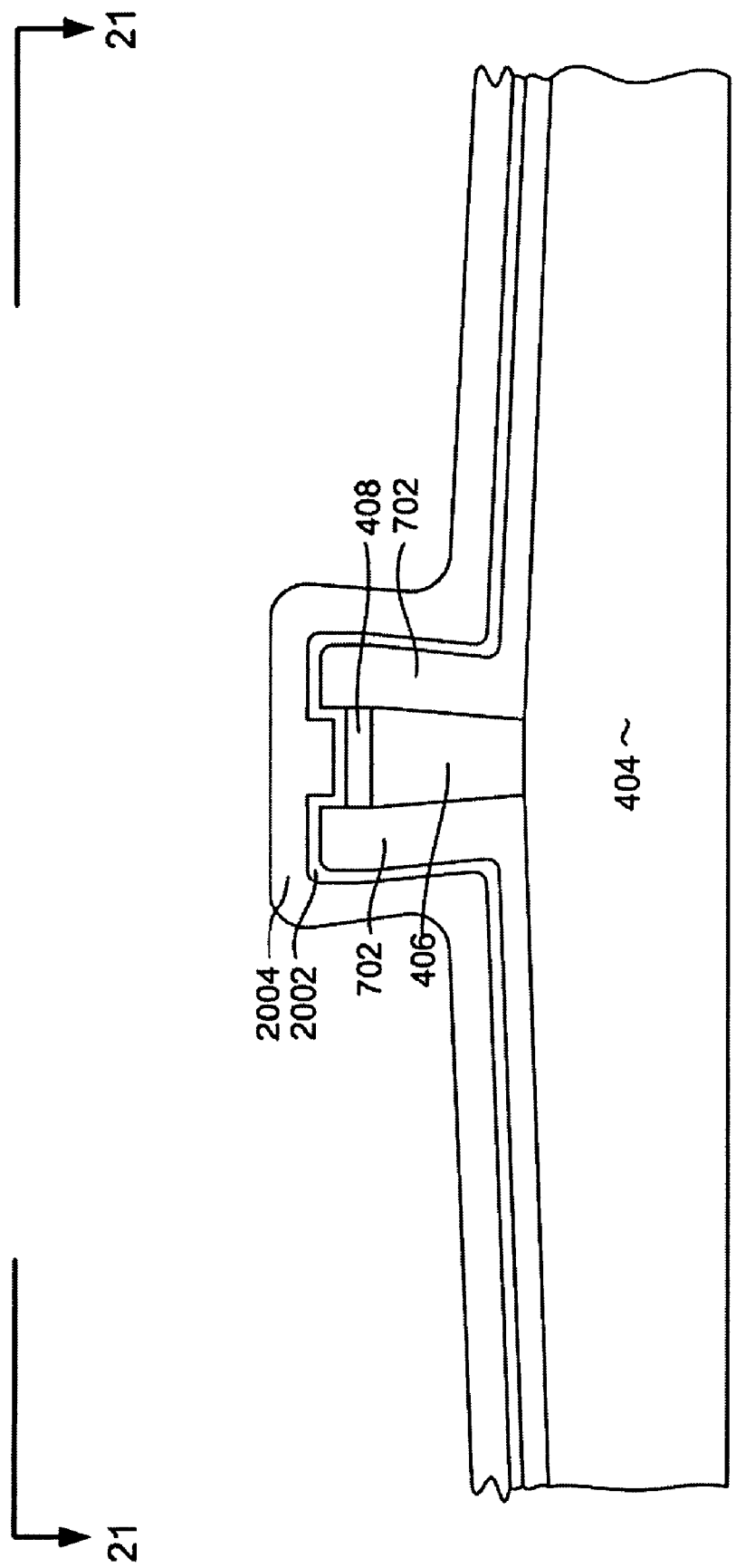
FIGS. 20-21 are views of a write head in various intermediate stages of manufacture illustrating a method for manufacturing a write head according to an alternate embodiment of the invention.
Figure 21:
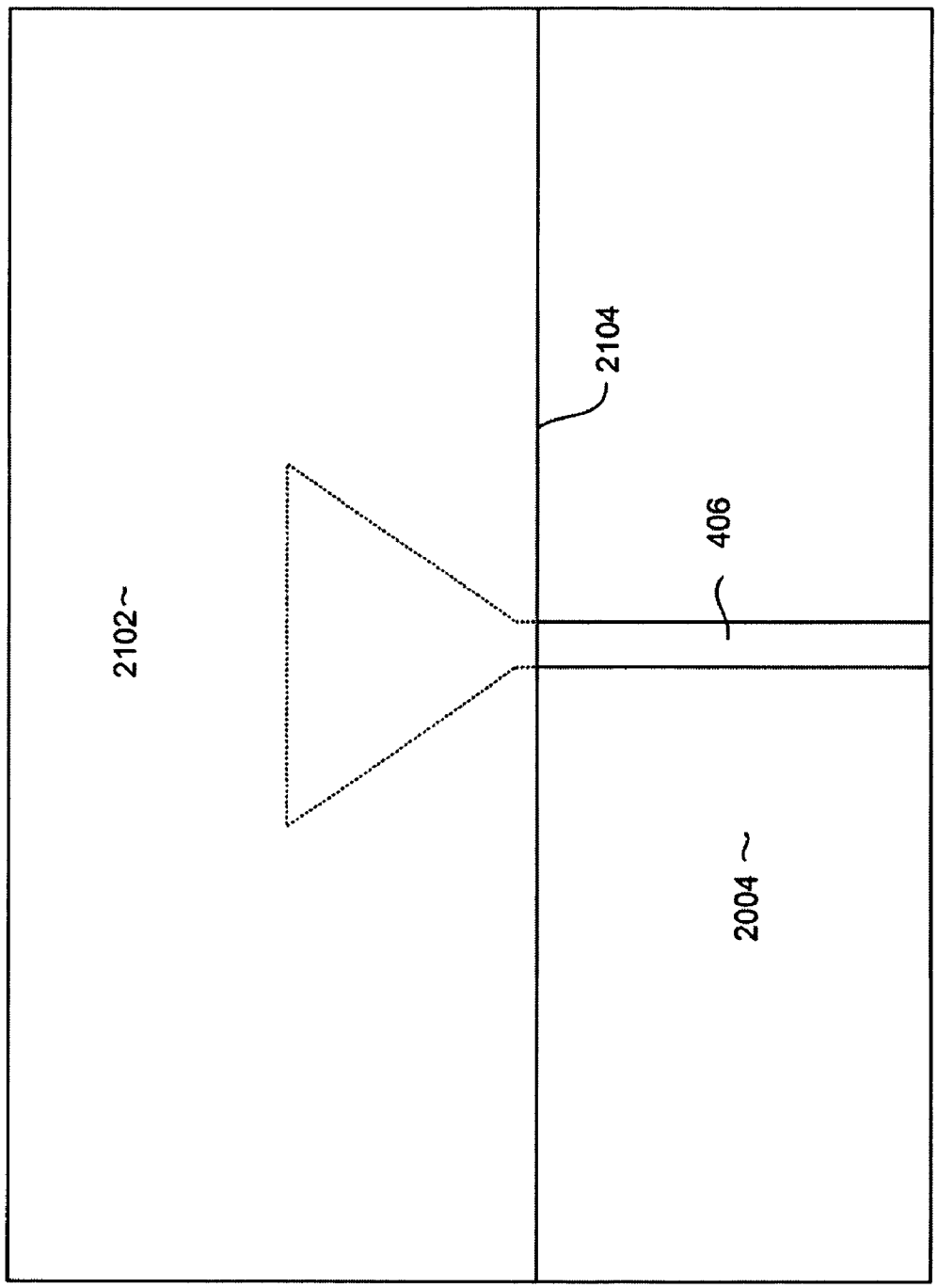

With reference now to FIGS. 20 and 21, another method for manufacturing a magnetic write head is described. Starting with a structure such as that shown in FIG. 9 a write head 406 is formed with non-magnetic side gap layers 702 and a non-magnetic trailing gap layer 408. Then, a non-magnetic seed 2002 (such as Rh, Ru, Ir NiCr, etc.) is deposited. Then, a layer of alumina 2004 is deposited full film. Then, with referenced to FIG. 21, a bi-layer mask 2102 is formed having a front edge 2104 that defines a front edge of a non-magnetic bump.

The mask layer 2102 can include an image transfer layer such as DURAMIDE® and a short wavelength photoresist layer such as 193 nm photoresist over the image transfer layer, or a single, thick photoresist layer. Therefore patterning of the mask 2102 can include a short wavelength photolithography to pattern the photoresist layer and a reactive ion etching to transfer the image of the photoresist onto the underlying image transfer layer. After the mask 2102 has been formed, a reactive ion etching or reactive ion milling is performed to remove portions of the underlying alumina layer 2004 (FIG. 20) that are not protected by the mask layer. The nonmagnetic seed layer 2002 also serves as a stop layer for the reactive ion etching or reactive ion milling process.

The mask 2102 can then be lifted off, and a wrap around shield structure can be plated after depositing a thin magnetic seedlayer (not shown). The remaining alumina layer 2102, provides a non-magnetic bump for defining a step feature in the wrap around shield.

Figure 22:
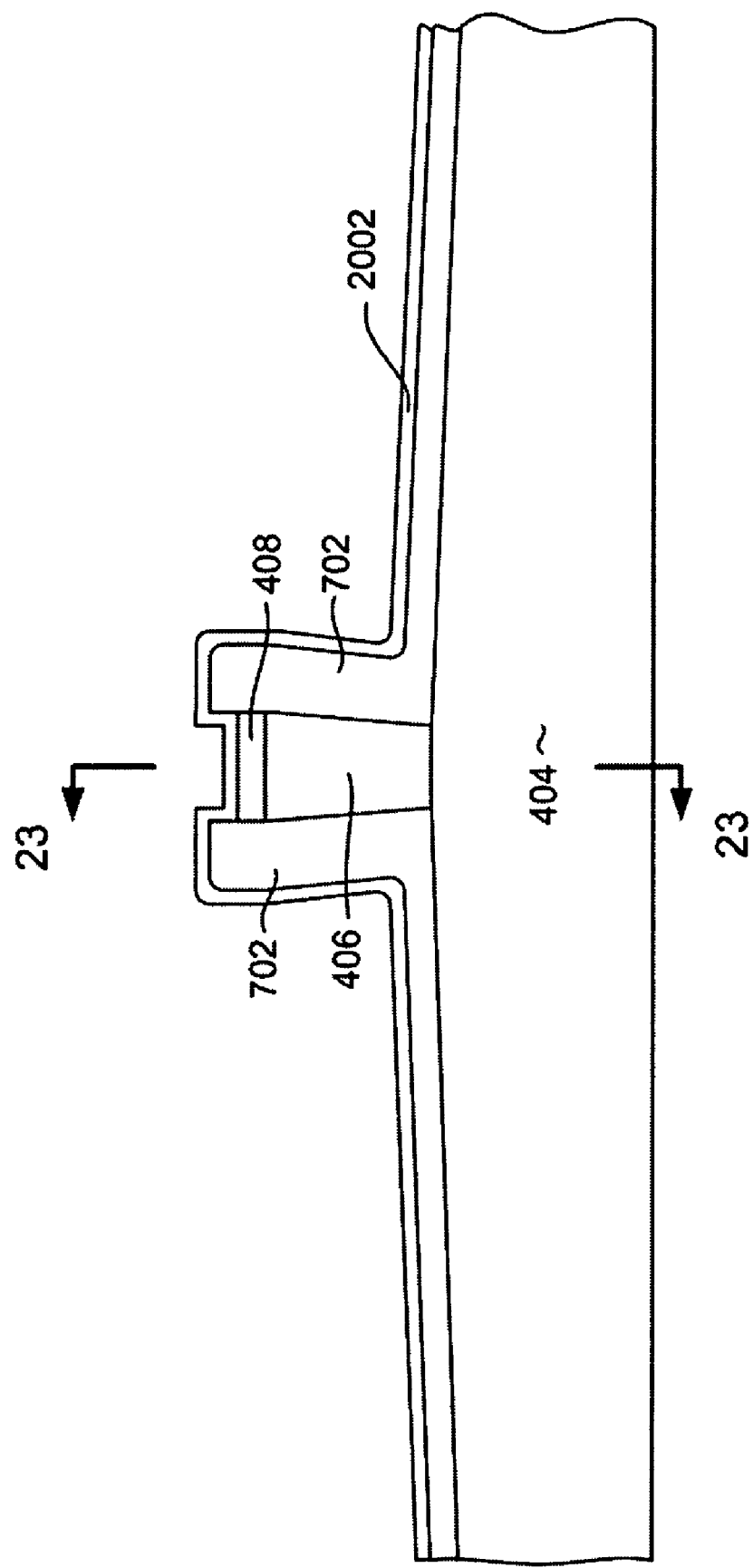
FIGS. 22-23 are views of a write head in intermediate stages of manufacture illustrating a method for manufacturing a write head according to another alternate embodiment of the invention.
Figure 23:
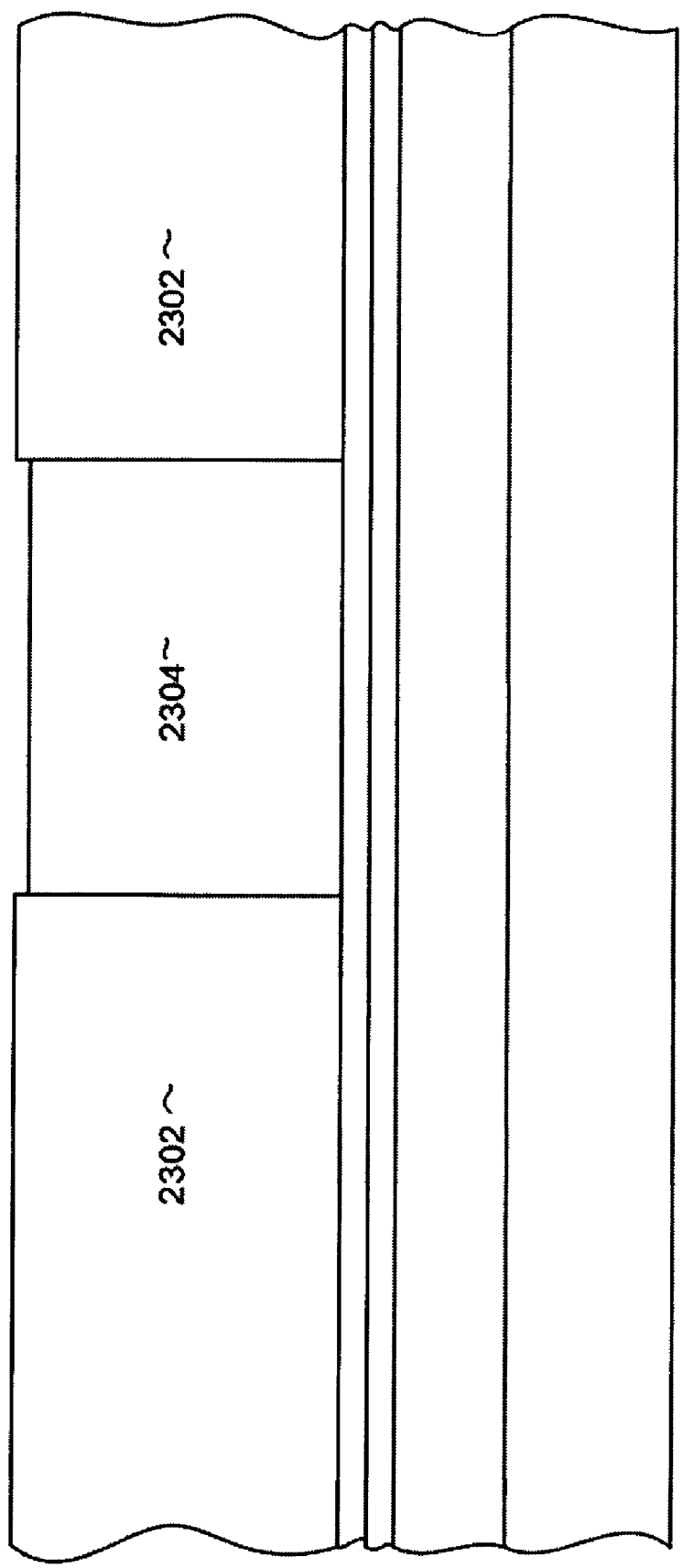

With reference now to FIG. 22, another method for manufacturing a magnetic write head is described. Starting with a structure such as that shown in FIG. 9, a write head 406 is formed with non-magnetic side gap layers 702 and a non-magnetic trailing gap layer 408. Then, a non-magnetic seed 2002 (such as Rh, Ru, Ir NiCr, etc.) is deposited. A mask layer 2302 will define a trench pattern as shown in FIG. 23. Then 20 nm to 100 nm nonmagnetic NiP film 3204 can be electrically plated into the resist trench. A wet stripping process can be performed to remove mask layer 2302, and leave the nonmagnetic NiP as a shield bump layer. A thin magnetic seed layer (not shown) can be deposited full film before electrically plating of the magnetic shield as described in FIG. 17.

Figure 24:
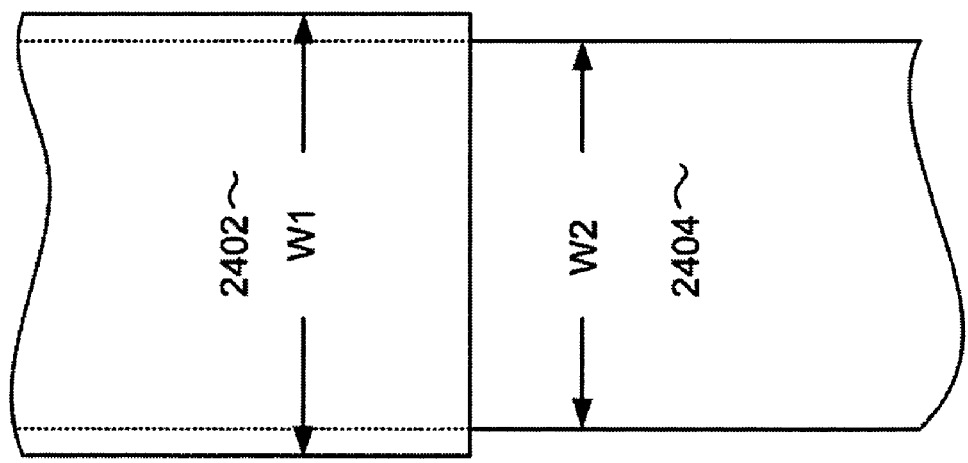
FIG. 24 is a top down view illustrating a method for measuring a thickness of a thin plated layer.

As shown in FIG. 24, a metrology method for accurately measuring thickness of a thin plated film is described. Previously, atomic force microscopy (AFM) has been required to accurately measure the thickness of a thin film having a thickness less than 100 nm. However, AFM is very time consuming and can not be used for high volume production monitoring. Here, a simple top down SEM trackwidth measurement of a plated portion 2402 and non-plated portion 2404 can give us a fast way to measure thin film thicknesses accurately. The plated structure 2402 is plated over the underlying structure 2404. The portion of the structure 2404 that is hidden beneath the plated layer 2402 is shown in dashed line in FIG. 24. The plated portion 2402 has a width W1, and the non-plated portion 2404 has a width W2. As can be seen, then, the thickness of the thin plated layer 2402 is one half of the difference between W1 and W2.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a write head for perpendicular magnetic recording, comprising:

forming a magnetic write pole having non-magnetic trailing gap layer formed at a trailing edge of the write pole and first and second non-magnetic side gap layers formed at first and second sides of the write pole;

forming a first mask structure configured to cover a region over the write pole and leaving an ELG region uncovered;

depositing a non-magnetic metal;
lifting off the first mask structure;
depositing a non-magnetic bump material;
forming a second mask structure having a front edge in the write pole region that is configured to define a front edge of a non-magnetic bump and a front edge in the ELG region that is configured to define a front edge of a electrical lapping, guide (ELG);
performing a reactive ion etching to remove portions of the non-magnetic bump material that are not protected by the second mask structure;
performing a first ion milling to remove portions of the non-magnetic metal that are not protected by a remaining portion of the non-magnetic bump material, thereby forming a front edge of an electrical lapping guide (ELG);
simultaneously electroplating first and second magnetic structures, the first magnetic structure forming a wrap-around trailing shield over a portion of the write pole, the second magnetic structure forming an electrical lapping guide mask; and
performing a second ion milling to remove remaining portions of the non-magnetic bump material non-magnetic metal that are not protected by the first and second magnetic structures.

2. A method as in claim 1 wherein the non-magnetic metal comprises a material selected from the group consisting of Ru, Au, Rh and Ir.

3. A method as in claim 1 wherein the non-magnetic bump material comprises TaO.

4. A method as in claim 1 wherein the non-magnetic bump material comprises a material selected from the group consisting of TaO, W, $SiO_2$ and SiN.

5. A method as in claim 1 wherein the second mask structure is configured such that the front edge in the write pole region is aligned with the front edge in the ELG region.

6. A method as in claim 1 wherein the first magnetic mask structure has a back edge and the second magnetic structure has a back edge and wherein the back edge of the first magnetic structure is aligned with the back edge of the second magnetic structure.

7. A method as in claim 1 wherein the second ion milling defines an electrical lapping guide, the method further comprising, measuring an electrical resistance of the electrical lapping guide and determining a distance between a non-magnetic bump front edge and a wrap around shield back edge based on the electrical resistance of the lapping guide.

8. A method as in claim 1 wherein the second ion milling defines an electrical lapping guide having a front edge that is aligned with a non-magnetic bump front edge and a back edge that is aligned with a wrap-around shield back edge, and wherein the method further comprises measuring an electrical resistance of the electrical lapping guide, based on the electrical resistance determining a distance between the non-magnetic bump front edge and the wrap-around shield back edge.

9. A method as in claim 1 wherein wrap around magnetic shield is formed with a step with its position defined by the non-magnetic bump, and wherein the second ion milling defines an electrical lapping guide having an electrical resistance the directly correlates to the position of the step, the method further comprising, measuring the electrical resistance of the electrical lapping guide and determining the position of step based upon the measured resistance.

10. A method as in claim 1 wherein the second mask layer is a bi-layer structure including an image transfer layer and a thin photoresist layer.

11. A method as in claim 10 wherein the thin photoresist layer is patterned using, a short wavelength photolithography.

12. A method as in claim 10 wherein the thin photoresist layer is patterned using a 193 nm photolithography.

13. A method as in claim 1 further comprising, after performing the reactive ion etching and before performing the first ion milling, forming a mask masking the write pole area.

14. A method as in claim 1 further comprising, after performing the reactive ion etching and before performing the first ion milling, forming a mask masking the write pole area and a hack portion of the ELG area, leaving a front edge of the remaining non-magnetic bump material exposed in the ELG area.

15. A method as in claim 1 further, comprising:
after performing the second ion milling, forming a third mask structure configured to cover the write pole area; and
performing a wet etch of the second magnetic structure and performing a second reactive ion etching to remove TaO.

16. A method for manufacturing a magnetic head, comprising:
providing a substrate;
forming a first mask structure, the first mask structure being formed to cover a feature area, and leaving an electrical lapping guide area uncovered;
depositing an electrically conductive layer in the electrical lapping guide area;
removing the first mask structure;
depositing a hard mask layer;
forming a second mask structure, the second mask structure having and front edge in the feature area that is configured to define a front edge of a first feature and a front edge in the electrical lapping guide area that is configured to define a front edge of an electrical lapping guide;
performing a reactive ion etching to remove portions of the hard mask layer that are not protected by the second mask structure;
performing an ion milling to remove portions of the electrically conductive layer that are not protected by the remaining hard mask layer;
simultaneously electroplating a structure having a back edge defining a second feature in the feature area and a mask having a back edge in the electrical lapping guide area;
performing an ion milling to remove portions of the electrically conductive material to define a back edge of an electrical lapping guide, wherein the lapping guide has an electrical resistance that correlates to a distance between the first and second features; and
measuring the electrical resistance of the electrical lapping guide to determine the distance between the first and second features.

17. A method as in claim 16 wherein the first feature is a non-magnetic bump and the second feature is a magnetic shield.

18. A method as in claim 16 wherein the first feature is a flare point of a magnetic write pole and the second feature is a back edge of a magnetic shield.

19. A method as in claim 16 wherein the hard mask layer comprises a non-magnetic material.

20. A method as in claim 16 wherein the hard mask layer comprises a material selected from the group consisting of TaO, W, SiO$_2$ and SiN.

21. A method in claim 16 wherein the hard mask material is a RIEable material.

22. A method as in claim 1 wherein the depositing a non-magnetic bump and forming a second mask structure further comprise, forming the second mask structure with a trench having a front edge that defines the front edge in the write pole region; and then depositing the non-magnetic bump material into the trench.

23. A method as in claim 22 wherein the non-magnetic bump material comprises NiP.

* * * * *